Jan. 7, 1930.  C. W. SAALBURG  1,742,282
MOVING PICTURE DEVICE
Filed Jan. 29, 1929   2 Sheets-Sheet 1
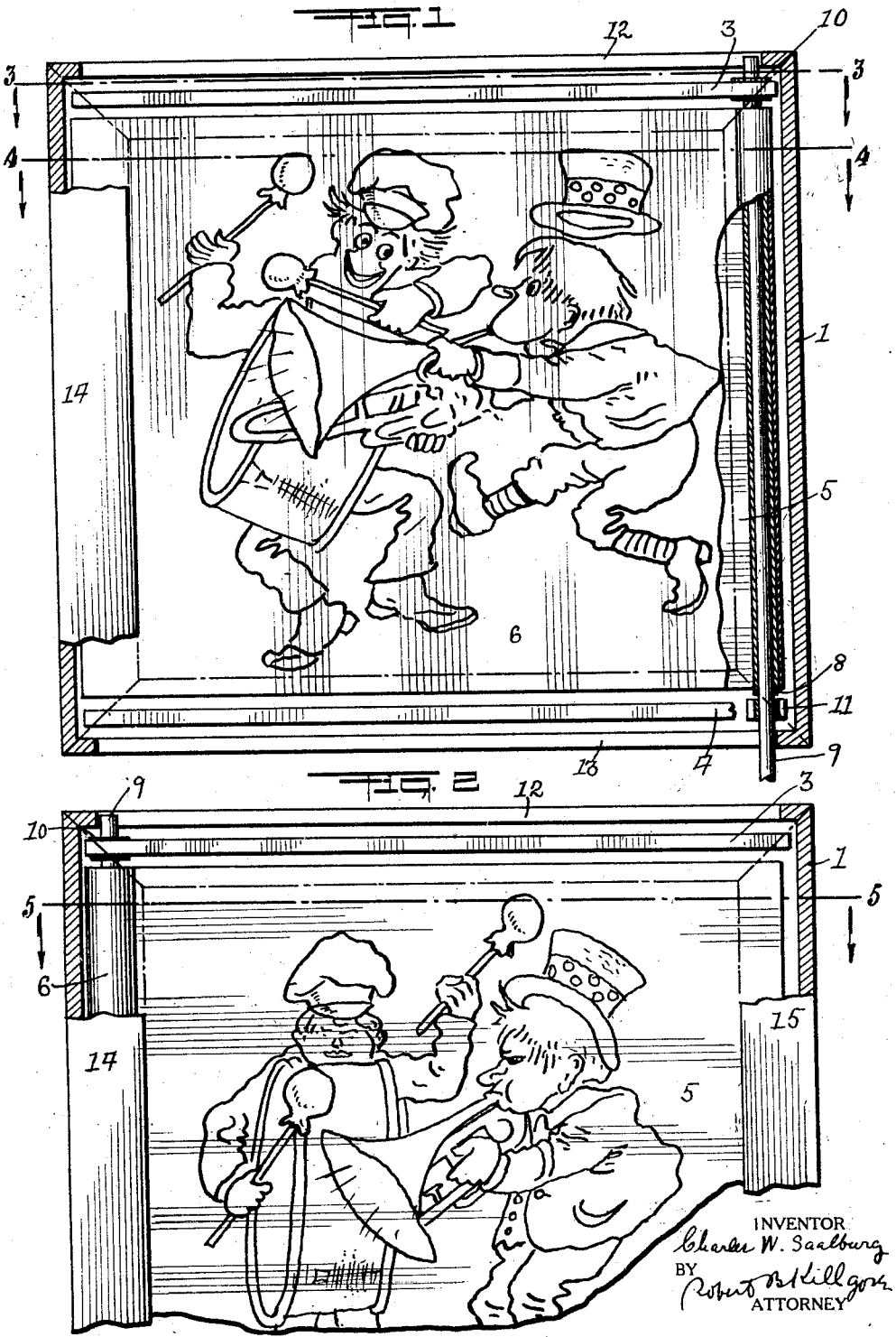

Jan. 7, 1930.                C. W. SAALBURG                1,742,282
                          MOVING PICTURE DEVICE
                          Filed Jan. 29, 1929        2 Sheets-Sheet 2
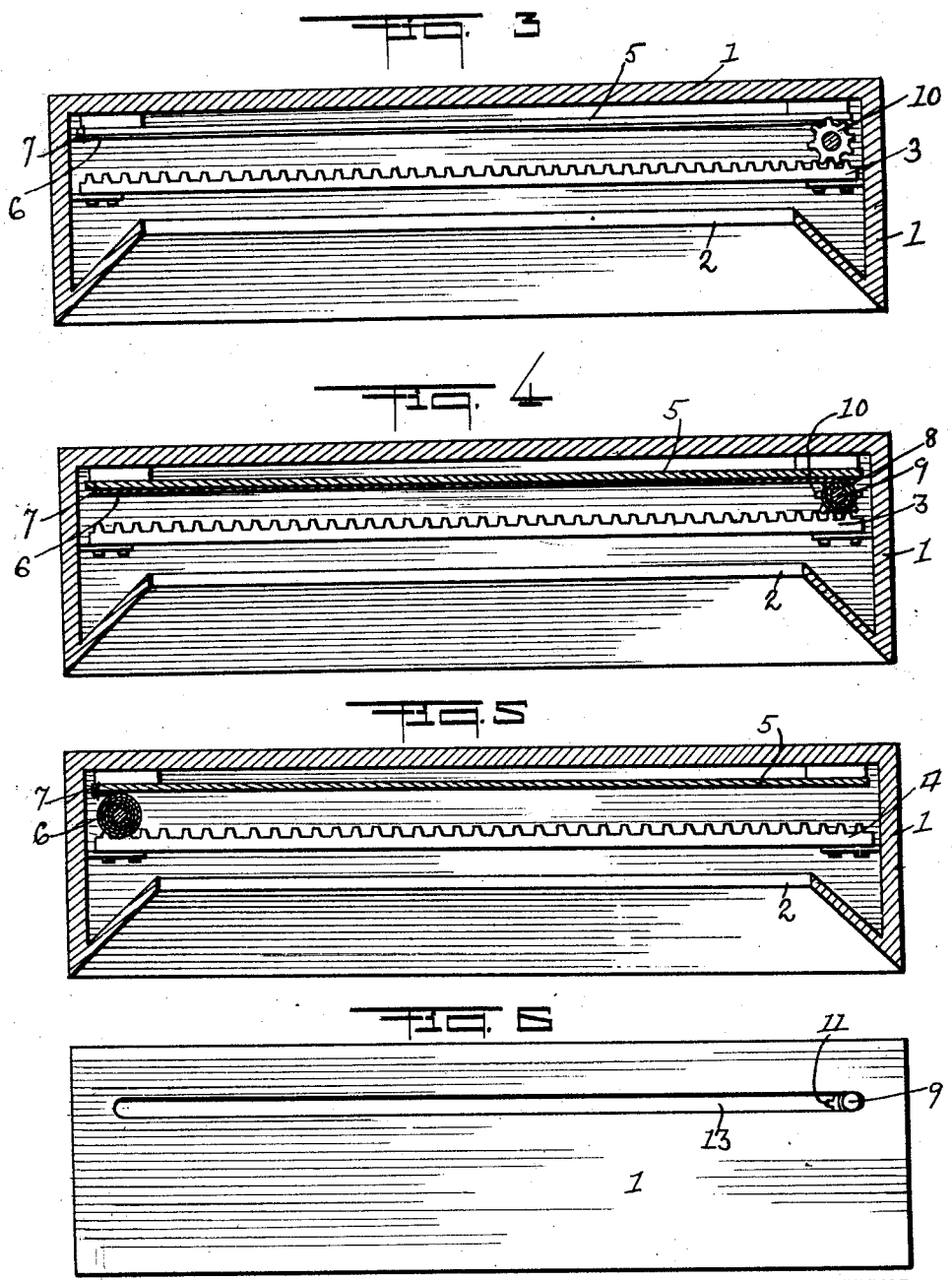

Patented Jan. 7, 1930

1,742,282

UNITED STATES PATENT OFFICE

CHARLES W. SAALBURG, OF EAST ORANGE, NEW JERSEY

MOVING-PICTURE DEVICE

Application filed January 29, 1929. Serial No. 335,968.

My invention relates to improvements in moving pictures used primarily for advertising and amusement purposes and it is my object to produce a device in which one picture depicting one attitude of a given subject will be so quickly replaced by a second picture of the same subject, but in a different attitude, that the illusion of movement will be produced.

In the drawing Fig. 1 is a front view, partly in section, of a device embodying my invention; Fig. 2 a like fragmentary view of the structure of Fig. 1 with the base picture substituted for the rollable one; Fig. 3 a sectional view of the structure of Fig. 1 on the line 3—3 thereof; Fig. 4 a sectional view of the structure of Fig. 1 on the line 4—4 thereof; Fig. 5 is a sectional view of the structure of Fig. 2 on the line 5—5 thereof; and Fig. 6 a view of the guide slot.

The device consists of a shadow box frame 1 having a glass 2 in its front opening. Across the top and bottom of the inside of the box racks 3 and 4 are secured. The base picture 5 made on a relatively stiff sheet of material is preferably detachably secured in the frame 1. This base picture depicts one position or attitude of the subject. The second picture 6 is made on rollable material and depicts the subject of the base picture in another and different position or attitude. The rollable picture is secured to the base picture at one end 7 and has a tube 8 secured to the other end. A rod 9 is slipped in the tube 8 and the tube revolves freely thereon. Pinions 10 and 11' are fixed to the ends of the tube 8 and engage the racks 3 and 4. The rod 9 extends above and below the pinions and runs in guide slots 12 and 13, which in the device shown are in the top and bottom of the frame.

The opening in the shadow box frame is small enough to cover and conceal the edges of the pictures and operating mechanism.

In order to produce the illusion of motion in the picture the rod 9 is slid quickly backwards and forwards in the guides 12 and 13. This causes the tube 8 to roll up the rollable, second picture, due to the action of the gears and pinions, until it is hidden behind the end 14 of the frame. This exposes the base picture and due to the difference in the attitudes of the subject, the figures seem to move. When the rod 9 is moved to the opposite end of the frame the rod and tube are hidden under the end 15 of the frame, the racks and gears causing the rollable picture to unwind from the tube and cover the base picture, presenting to the eye the second, and different attitude of the figures in the picture. As the picture 5 is rolled back and forth the illusion of motion is continuous.

The base picture is not necessarily in a plane but may be curved to economize space.

The pictures may be secured to the frame in any suitable manner so that they may be easily changed when desired.

The rod 9 may be slid backwards and forwards in the guide by hand or any suitable power driven mechanism.

I claim:—

1. In a moving picture device, a box frame, guides in the upper and lower parts thereof, racks within the frame adjacent the guides, a base picture within the frame, a second, rollable picture secured to the base picture at one end, a tube secured to the other end of the rollable picture, a pinion on each end of the tube meshing with a rack and a rod extending through the tube and engaging the guides whereby said second picture is rolled and unrolled on the reciprocation of the rod.

2. In a moving picture, a fixed base picture showing one attitude of a subject, a second, rollable picture thereover showing a second and different attitude of the subject, one end of which is secured to the base picture, a roller secured to the free end of the second picture and means for moving said roller across the base picture whereby the second picture is rolled and unrolled covering and uncovering the base picture.

In testimony whereof I have affixed my signature.

CHARLES W. SAALBURG.